United States Patent [19]

Schirrmacher

[11] Patent Number: 5,100,275
[45] Date of Patent: Mar. 31, 1992

[54] QUICK LOCKING FASTENERS

[76] Inventor: Wendell E. Schirrmacher, 19201 Deerborne, Northridge, Calif. 91324

[21] Appl. No.: 555,805

[22] Filed: Jul. 19, 1990

Related U.S. Application Data

[63] Continuation of Ser. No. 52,492, May 20, 1987, abandoned.

[51] Int. Cl.$^5$ .................................................. F16B 37/10
[52] U.S. Cl. ................................. 411/433; 269/184; 411/6; 411/267
[58] Field of Search ................ 411/533, 433, 432, 1, 411/6, 434, 265–267, 301–303; 269/184, 185

[56] References Cited

U.S. PATENT DOCUMENTS

| | | | |
|---|---|---|---|
| 323,358 | 7/1885 | Noyes et al. | 411/265 X |
| 2,294,745 | 9/1942 | Goetz | 411/433 X |
| 2,367,480 | 1/1945 | Beswick | 411/433 |
| 2,974,557 | 3/1961 | Akutowicz | 411/434 |
| 3,117,485 | 1/1964 | Jansen | 411/434 X |
| 3,157,215 | 11/1964 | Zahodiakin | 411/267 |
| 3,352,341 | 11/1967 | Schertz | 411/433 X |
| 3,695,139 | 10/1972 | Howe | 441/433 X |
| 3,797,336 | 3/1974 | Howe | 411/434 X |
| 4,071,158 | 1/1978 | Maheu | 411/433 X |
| 4,332,169 | 6/1982 | Stuart | 411/433 X |
| 4,509,724 | 4/1985 | Okada | 411/433 X |

FOREIGN PATENT DOCUMENTS

| | | | |
|---|---|---|---|
| 687083 | 5/1964 | Canada | 411/433 |
| 729394 | 3/1966 | Canada | 411/433 |
| 717229 | 2/1942 | Fed. Rep. of Germany | 411/265 |
| 302654 | 1/1955 | Switzerland | 411/265 |

*Primary Examiner*—Lloyd A. Gall
*Attorney, Agent, or Firm*—Dilworth & Barrese

[57] ABSTRACT

A quick locking fastener has a base defining an interior chamber and forward and rearward portions. Plural generally contiguous internally threaded insert nut segments are in the interior chamber of the base, having a tail remote from the forward portion of the base. The nut segments have a first bevel exterior surface adjacent the forward portion of the base, a cylindrical surface adjacent the first bevel surface, and a second exterior bevel disposed on the tail, spaced apart and coaxial with the first bevel surface. A rearward disposed end cap having a bevel and a circular compresssion spring circumferentially disposed about a third bevel surface engages and biases the nut segments towards the front of the base. A retainer ring having a band surrounding the end cap has inwardly directed tangs preventing rotation of the insert segments. A lockwire surrounds the retaining ring and engages the base preventing rotation of the endcap, retaining ring and insert segments, except at such time as a design torque is exceeded.

12 Claims, 4 Drawing Sheets

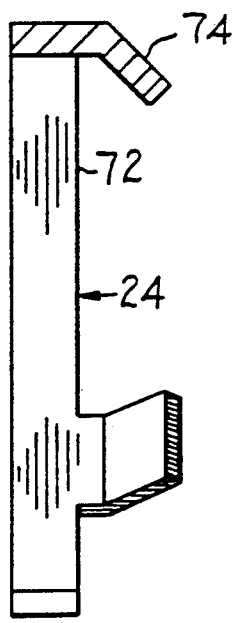
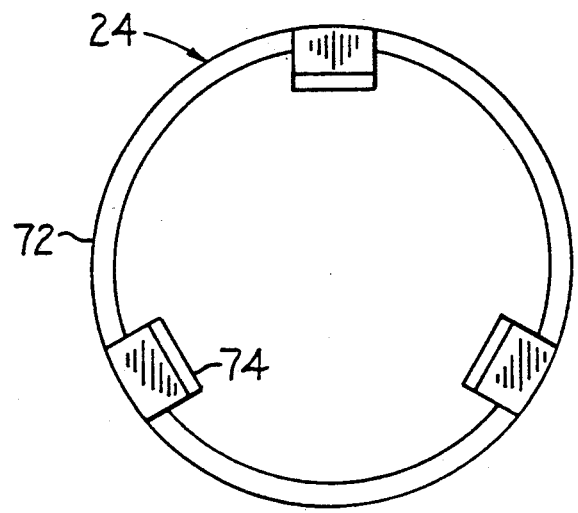
FIG.3  FIG.4
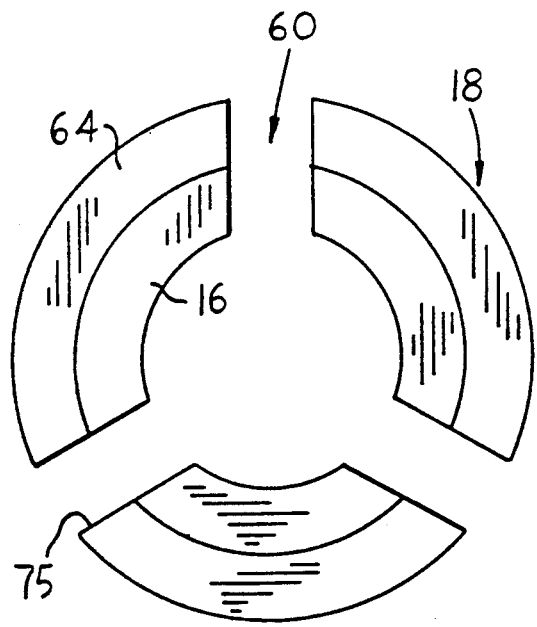
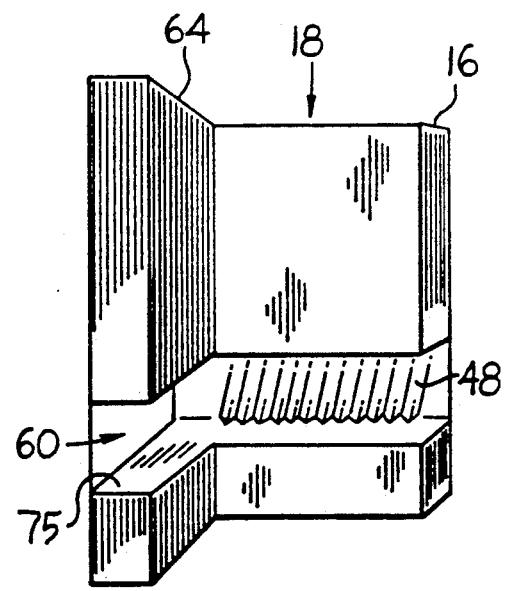
FIG.5  FIG.6

QUICK LOCKING FASTENERS

This is a continuation of copending application Ser. No. 07/052,492 filed on May 20, 1987, now abandoned.

1. FIELD OF THE INVENTION

This invention pertains to quick locking fasteners. More particularly, this invention pertains to quick engaging fastening nuts for engagement of bolts and pipe fittings.

2. BACKGROUND OF THE INVENTION

Quick locking fastening nuts have been available for various purposes in the past. The objective of a quick locking fastening nut is to be able to translationally slide the fastening nut on a bolt or threaded member without the necessity of rotation until the fastening nut is in substantial final engagement against an abutment surface of the head of the bolt. A wrench or other tool is used to tighten the fastening nut during its final rotational engagement. This is achieved by a wedging action which causes a tightening of a segmented internally threaded insert set in the nut casing. The segments are spread apart by the threads of a bolt inserted through the threaded aperture defined by the segments, allowing the bolt to be pushed through by translational movement. However, the segments are sufficiently confined within the nut casing to allow the nut segments to grasp the threads when rotated into engagement.

In the prior art, one type of self locking nut uses a segmented insert set in a casing cavity. The insert set has a frustoconical exterior surface. The tendency of a bolt or threaded member acting against the threads of the insert set of this device is to cause an uneven spread of the insert segments and applying uneven and excessive forces on the threads. As a result, self locking nuts such as these have been unable to withstand fastening adequately, since the parts have a tendency to become loosened, and insufficient fastening action is available which results in a tendency to create excessive stress.

SUMMARY OF THE INVENTION

The present invention provides a fastening nut which has a casing having an internal cavity defining a central axis. The cavity has a segmented insert set comprising a plurality of mating insert segments disposed within the cavity of the casing. The insert set defines an annular substantially contiguous yet spreadable interior thread for mating with the threads of a threaded member such as a bolt. The exterior surface of the insert set has a first annular bevel surface adjacent a forward portion of the casing, and a second annular bevel surface of greater maximum radius than the first annular bevel surface which is positioned coaxial, parallel and spaced from the first annular bevel surface. The first and second bevels are at substantially the same angle to the central casing axis. First and second annular inclined surfaces on the interior surface of the casing abut the first and second bevel surfaces of the insert segments in sliding engagement. The first and second annular inclined surfaces allow the segments to be outwardly guided by spreading of the segments during translational movement by a threaded member, and inwardly pulled forward to centrally grasp the thread of a threaded member when rotated towards a fully engaged position. This provided generally balanced radial forces against the threads of a threaded member and the internal threads of the insert segments.

In a more specific example, a biasing arrangement is provided for tending to maintain the insert segments in a forward position in the casing. Additional features in accordance with this invention include a circular spring as part of the biasing arrangement, adjacent the rear of the insert segments, disposed about a bevel surface on an end cap. An annular retaining ring having plural inwardly directed tangs interengages the insert segments to prevent rotation of the insert segments. A lock ring disposed intermediate the retaining ring and the interior of the end cap provides torque limiting, whereby the segments can rotate when the torque exceeds a predetermined design force.

BRIEF DESCRIPTION OF THE DRAWINGS

The nature of the invention described herein may be best understood and appreciated by the following description taken in connection with the accompanying drawings in which:

FIG. 3 is a plan view of the retaining ring of FIG. 1 in accordance with this invention;

FIG. 4 is an elevational view of the retaining ring depicted in FIG. 5;

FIG. 5 is a top elevational view of the insert segments in accordance with this invention;

FIG. 6 is a side elevational view of the insert segments depicted in FIG. 3;

DETAILED DESCRIPTION

Figure 1:
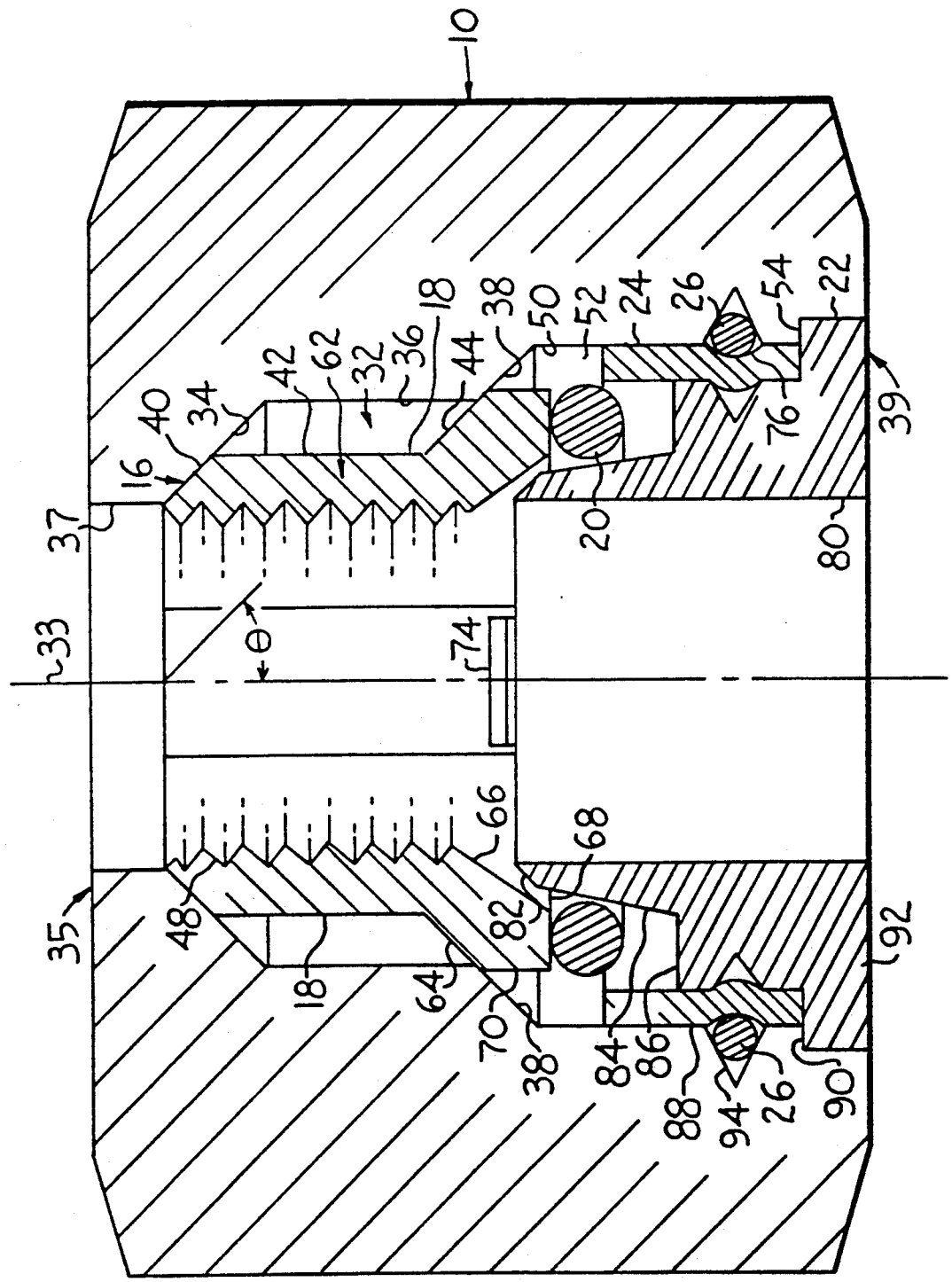
FIG. 1 is a cross-sectional view of a quick locking fastener in accordance with this invention.
Figure 2:
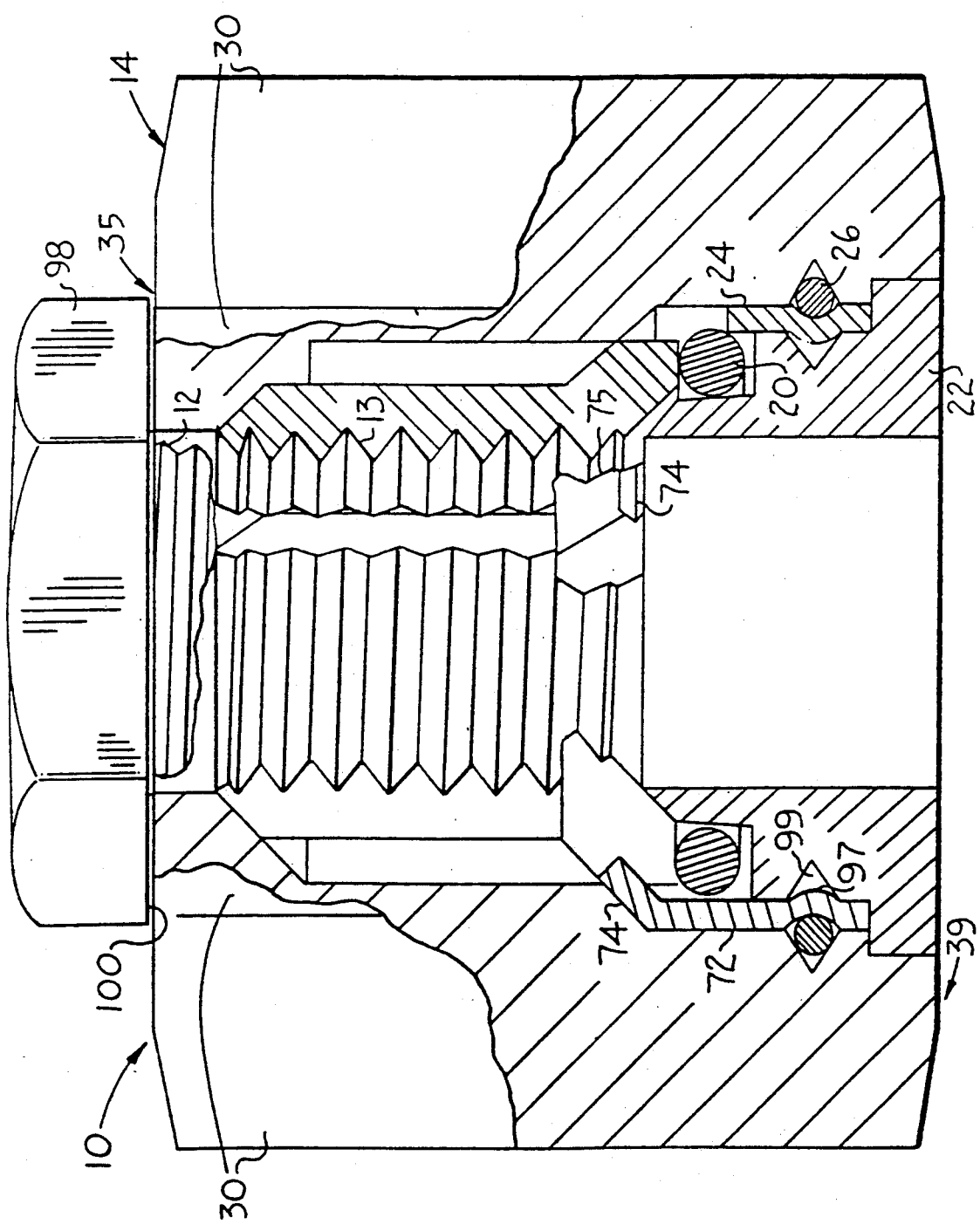
FIG. 2 is a cross-sectional view with portions exposed and portions removed of the fastener depicted in FIG. 1.
Figure 7:
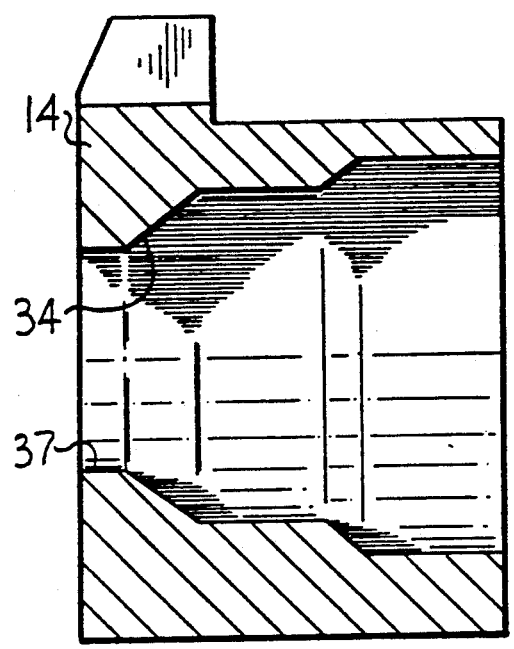
FIG. 7 is a side cross-sectional elevational view of a casing of a quick locking fastener in accordance with this invention.
Figure 8:
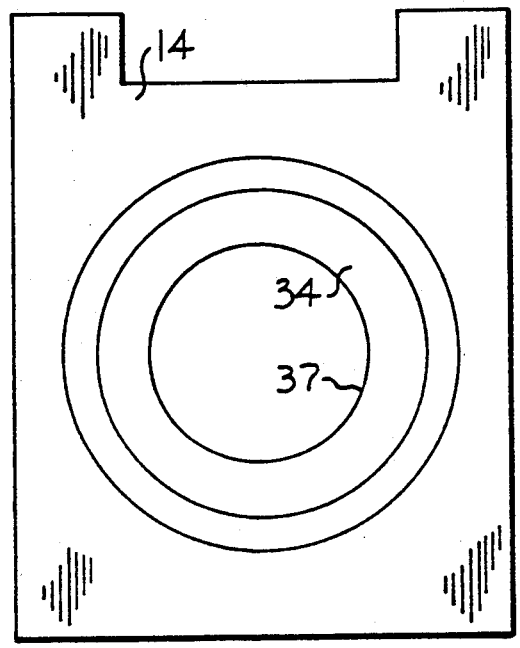
FIG. 8 is a front elevational view of the casing depicted in FIG. 7.

With particular reference to FIGS. 1 and 2 a quick locking fastening nut assembly 10 is depicted for quickly and lockably receiving a nut whereby substantial movement is achieved by translational travel rather than by rotational movement. The nut assembly 10 comprises a threaded member 12 and a casing body 14. An annular insert set 16 is disposed within the casing body 14. The insert set 16 comprises a plurality of arcuate segments 18 as shown in FIGS. 5 and 6. A spring 20 encircles an end cap 22 and engages the insert segments 18. A circular retaining ring 24 as shown in FIGS. 3 and 4 coacts with the insert segments 18 and prevents rotation of the insert segments 18, unless a design torque is exceeded.

The casing body 14 has six (6) facets 30 as is conventional for threaded nuts. The casing body 14 defines a cavity 32 about an axis 33 having a forward portion 35 adjacent a bolt aperture 37 and a rearward portion 39. The bolt aperture 37 allows clearing for receiving the threads of the bolt 12 without interference. The casing body 14 has a first inner annular inclined surface 34 for engaging the segments 18, an adjacent cylindrical surface 36 for receiving the insert segments 18 and a second inner annular inclined surface 38 also for engaging the segments 18. Each of the inclined surfaces 34, 38 are disposed at the same acute angle θ to the casing axis 33.

Each segment 18 has a bevel surface 40 adjacent and opening to one end of a cylindrical external surface 42. The cylindrical surface 42 is adjacent to a second bevel surface 44 at its opposite end spaced apart from the first bevel surface 40. The bevel of surface 40 is disposed at the same angle θ to the casing axis 33 as that of the bevel surface 44. Moreover, that is the same angle as the angle of the inclined annular surfaces 34, 38 to the casing axis 33. Typically, that angle is 31 degrees, an angle less than 60 degrees applies the most pressure on the threads 13 of the bolt 12 and the thread segments 48 of the insert segments 18.

The bevel surface 40 engages the annular inclined surface 34 of the casing cavity 32 and the bevel surface 44 engages the second annular inclined surface 38 of the casing cavity 32.

The second annular inclined surface 38 opens to an interior cylindrical surface 50 adjacent the rearward portion 39 of the body 14. The cylindrical interior surface 50 receives the retaining ring 24 and confines the spring 20 within a spring channel 52. The spring is enclosed within the channel 52 to prevent dirt from entering and to restrict motion of the insert segments 18. An annular abutment surface 54 adjacent the interior cylindrical surface 50 provides a stop surface for the end cap 22.

The insert segments 18 have internal thread segments 48 for receiving threads 13 of a bolt 12. The spacing between segments 18 defines gaps 60. The width of the gaps 60 as the segments 18 move outwardly from the symmetrical axis 33 relative to the casing body 14 as a bolt is inserted.

The insert segments 18 have a forward portion 62 which includes the threaded segments 48 on its interior surface and the first bevel surface 40. Extending from the forward portion 62 of each insert 18 is an outwardly tapered tail 64 having the second bevel surface 44. The tail 64 has an inner annular spreading guide surface 66 for causing the segments 18 to spread apart as the segments 18 are pushed away from the forward portion 35, towards the rearward portion 39 as a bolt is pushed through the fastening nut. At the end of the tail 64, an end surface 68 engages the spring 20. Outer circumferential cylindrical end surfaces 70 disposed on the tail 64, along with the cylindrical surface 42 about the forward portion 62, limit the outward spread and travel of the insert segments 18.

The beveled surfaces 40 and 44 of the insert segments 18 are disposed at substantially the same angle θ to the central axis 33. Multiple inclined surfaces 34 and 38 of the casing body abut the beveled surfaces 40 and 44, and the beveled surfaces 40 and 44 of the insert segments are movable axially along the inclined surfaces 34 and 38 of the casing body 18. The beveled surfaces 40 and 44 of the insert segments 18, along with the inclined surfaces 34 and 38, as well as with the cylindrical external surfaces 42 of the insert means and the internal surface 50 of the casing, define a deformable open region at 32 having a substantially parallelogram shape. When a bolt 12 is pushed through the fastening nut, the open region deforms from a first position in which the insert segments 18 are in an open position (as best seen in FIG. 1) to a second position where the insert segments are in a fastened position (as best seen in FIG. 2). The first position would typically occur prior to a bolt 12 being pushed through casing body 14. The second position occurs after the bolt has been pushed through and the fastening nut has been rotated for tightening. After tightening, the open region 32 maintains an open, yet deformed configuration relative to the first position, and the insert segments are in a fastened position. In the fastened position, radially directed forces are distributed across the open region, applied against the forward and rear portions of the insert segments 18.

The retaining ring 24 comprises a cylindrical band 72 and three (3) spaced apart tangs 74 bent and extending inwardly on one side of the cylindrical band 72. The insert segments 18 have surfaces 75 remote from the forward portion 35 of the casing 14. The retaining ring 24 and the tangs 74 engage the surfaces 75 of the insert segments 18 to prevent the insert segments 18 from rotating relative to the casing as the bolt 12 is tightened. The retaining ring 24 has a circumferential groove 76 for receiving a lockwire ring 26 which fixes the positioning of the retaining ring 24, end cap 22 and insert segments 18.

Figure 9:
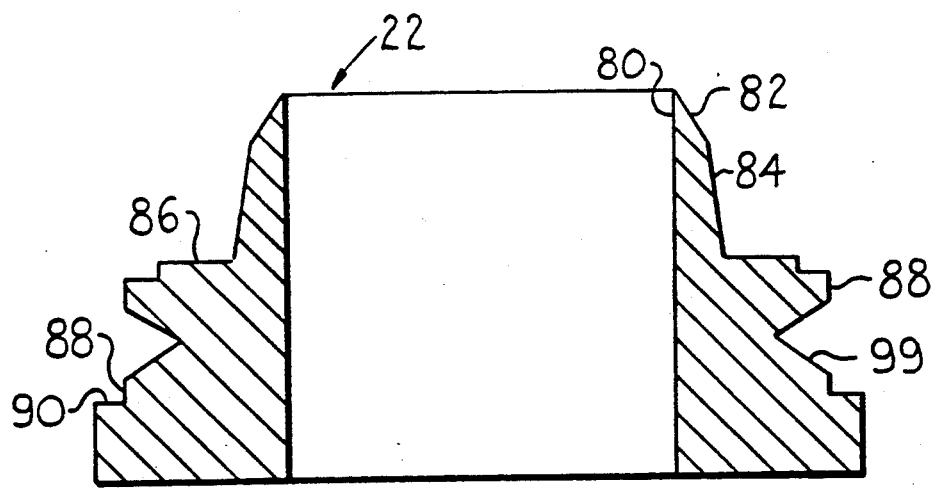
FIG. 9 is a cross sectional view of an end cap of a quick locking fastener in accordance with this invention.

The endcap 22 as shown in FIG. 9 is an annular member having a central bolt aperture 80 for receiving a bolt 12 or other threaded member without interfering with the threads 13. A spreading bevel surface 82 disposed about one end of the end cap 22 extending away from the bolt aperture 80 is oriented at an angle equal to that of the spreading guide surface 66 of the tails 64 of the input segments 18. Adjacent the bevel surface 82 is a spring biasing bevel surface 84 extending about the end cap 22.

An annular ledge 86 extends outwardly on the end cap 22 adjacent the biasing bevel surface 84. The ledge 86 limits travel of the spring 20 and thus prevents excess travel and spreading of the tails 64. A cylindrical surface 88 adjacent the ledge 86 receives the circular band 72 of the retaining ring 24. A ring surface 90 adjacent the rearward end 92 of the end cap 22 receives the band 72 of the retaining ring 24. A groove 94 in the casing body 14 provides space for a lockwire ring 26 which rest about circumferential groove 76 in the retaining ring 24. As best seen in FIG. 2, a circular protrusion 97 is forced against a circumferential groove 99 in the end cap 22. The lockwire 26 is fixed in place. The endcap 22 is typically force fit or epoxy glued in the body casing 14 though other fastening techniques may be used. The spring 20 is a circular spring which is seated on the spring biasing bevel surface 84.

Thus, engagement of the bolt 12 to the body 14 occurs when increasing force is placed down on the bolt 12 as it is tightened, distributing all forces toward the thread from the two bevel surfaces 40, 44 on the insert segments 18 acting on the individual surfaces of the body 14 for applying a generally inform pressure to all portions of the threads 13 being engaged.

An additional feature of the invention is torque limiting which is provided by the retaining ring 24. The retaining ring 24 engages the insert segments 18 and is set at the desired load so it will not become overtightened to stress the bolt 12 or fitting threads 48.

The specific number of inserts 18 varies according to the size or diameter of the threaded member 12 to be engaged and the coarseness of the thread. Coarser threads require more insert segments 18. Smaller fasteners such as those having a thread 12 diameter of ¼ inch or less use two inserts 18, while for larger thread diameters, it is preferable to have a greater number of inserts segments 18. Thread diameters of ⅜ inch or greater preferably use 4 inserts.

The tails 64 are provided on the insert segments to provide guiding and retainment of the inserts and additionally provide a downward force on the back of an insert so as to equalize pressure on insert segments downward on the threads 13.

Spring tension can vary on application of use. Stronger tension is used where it is important for the nut or fitting not to rotate freely. The spring tension is based on the spring coefficient and the angle of the spring bevel surface 84.

The present design provides for very little lateral motion of bolt 12 to engage the thread 13. Even if the thread 13 is damaged, the thread 13 can still be engaged.

The fastening nut assembly 10 has more gripping force than standard nuts because the insert segments 18 continue to create inward forces as they are tightened. Standard nuts create forces which extend outward away from the thread as more torque is added.

In operation, a bolt or threaded member 12 is pushed through the bolt aperture, engaging the threads segments 48 of the inserts 18. The threads 13 of the bolt interfere and push against the thread segments 48 of the threaded member 18, causing the segments 18 to be pushed downward away from the forward portion 35 of the casing 14. In so doing, the surfaces 64, 66 bear on the surfaces 38, 82. The spreading surface 66 of the tail 64 engages the bevel 82, causing the tails 64 to expand outward, further causing the segments 18 to expand outwardly.

Once the bolt 12 has been pushed through the threads, it passes through, clearing the bolt aperture 80 of the end cap 22 and extends through the rearward portion 39 of the end cap 22. The end of the threaded member 12 has a cap or head 98 and an abutment surface 100, which contacts forward portion 35 of casing 14. The abutment surface of the head 98 of the bolt 12 engages the body 14, the head 98 is then rotated for final fastening. Depending upon the type of head 98 and the nature of the fastening, the head 98 may be rotated by a wrench, screwdriver or by hand. The objective is that minimal rotational movement is required to completely fasten the bolt 12 to the fastening nut 10.

As the bolt 12 is rotated, the threads 13 engage the threads 48 of the insert segments 18. The thread segments 48 pull the insert segments 18 toward the forward portion 35 of the casing 14, the tails 64 spreading on the spreading bevel 82 pulling inwardly, reducing the size of the gap 60 between the insert segments 18. The bevels 40, 44 and inclined surfaces 34, 38, being disposed at the same angles maintain the forces on the threads to establish uniform forces.

When the fastening nut is rotationally tightened, the tangs 74 disposed between the segments 18 at the surfaces 75 prevent rotation of the insert segments 18. Should excess rotational force be applied, the lockwire 26, retaining ring 24 and end cap 22 will rotate, preventing excessive forces, from being applied to the assembly 10 and thus prevent overtightening or stripping of the threads 13, 48.

Thus, a quick locking fastener has been disclosed which exerts uniform forces on the threads to enhance the loads supportable by the assembly, and further provides for torque limiting, preventing overstressing of the threads.

While the invention has been shown and described with respect to specific forms thereof, it will be understood that changes and modifications may be made in accordance with the spirit and scope of the invention.

What is claimed is:

1. A fastening nut comprising:

casing means having an interior cavity including a plurality of concentric cylindrical interior surfaces having increasing diameters, said cylindrical surfaces being connected by outwardly tapered frusto-conical surfaces extending at an angle from a central axis of said casing means;

internally threaded segmented insert means positioned within said cavity of said casing means, said segmented insert means having a substantially cylindrical shape and including a frusto-conical forward portion and a frusto-conical tail portion, said forward portion extending inwardly and said tail portion extending outwardly at an angle from said central axis of said casing means, said angle being substantially identical to said frusto-conical surfaces of said interior surfaces of said casing means, said tail portion further having a frusto-conical interior surface extending at an angle substantially identical to said frusto-conical surfaces of said interior surfaces of said casing means;

an end cap for retaining said insert means within said cavity of said casing means, said end cap having a frusto-conical end portion positioned adjacent said frusto-conical interior surface of said tail portion of said insert means;

wherein said frusto-conical surfaces of said insert means is maintained in sliding engagement with said frusto-conical surfaces of said interior cavity of said casing means and said frusto-conical end portion of said end cap, such that a threaded member translationally inserted through said fastening nut spreads said segmented insert means to allow passage therethrough, said segmented insert means slidingly moving along said frusto-conical surfaces to allow said threaded member to pass therethrough, so that when said translational movement ceases, said internal threads of said insert means contact said threaded member to allow for tightening of said fastening nut to said threaded member through rotational movement of said casing means.

2. A fastening nut as set forth in claim 1, further comprising biasing means for biasing said insert means in a direction away from said end cap.

3. A fastening nut as set forth in claim 1, further comprising means for nominally preventing rotation of the insert means relative to the casing means, and torque limiting means disposed within the cavity of the casing and in coupled engagement to the insert means, whereby rotation of said threaded member at a torque greater than a predetermined design torque results in a rotation of the insert means within the casing means, thus preventing the application of excessive torque forces to the threads of the insert means and said threaded member.

4. A fastening nut comprising:

casing means defining a forward portion for receiving a threaded member, a rearward portion remote from the forward portion, and an interior cavity for retaining an insert arrangement, the interior cavity having a central axis and including an interior surface;

internally threaded segmented insert means for releasably engaging the thread of said threaded member, the insert means being spreadable for allowing said threaded member to be inserted translationally through the segmented insert means, said insert means being engagable in a fastening relationship with said threaded member when said fastening nut is rotated relative to said threaded member, the insert means having an annular, substantially contiguous thread for mating with the threads of said threaded member, the insert means being disposed with the casing means;

means for biasing the insert means toward the forward portion of said casing means, said biasing means including a circular spring means for engaging the insert means;

cap means for retaining the insert means within the cavity of the casing means, the cap means disposed adjacent the rearward portion of the casing means;

retaining ring means for preventing rotation of the insert means, said retaining ring means including a circular band and spaced apart plural inwardly directed tangs, said tangs being positioned between said segments and engaging side surfaces of the segments of said segmented insert means remote from the forward portion of the cavity;

the insert means further including a forward portion and a tail, the forward portion and the tail having spaced apart bevel surfaces disposed at substantially equal angles to the central axis of the casing means, and the casing means having multiple inclined surfaces mating with the bevel surfaces of the insert means, whereby the bevel surfaces of the forward portion and the tail are movable radially along the inclined surfaces of the casing means;

such that when said threaded member is pushed through the segmented insert means the segmented insert means will spread apart to allow translational movement of said threaded member through the insert means, so that a fastening rotation of said threaded member causes the insert means to grasp the threads of said threaded member.

5. The fastening nut as set forth in claim 4, wherein the insert means comprises 3 segments, each defining an arc of less than about 120 degrees and the internal thread diameter is between about ¼ inch and ⅝ inch when said threaded member is engaged by said threads.

6. The fastening nut as set forth in claim 4 and in which the angle of the bevel surface is between 31 degrees and 60 degrees.

7. The fastening nut as set forth in claim 4, further comprising a lockwire disposed circumferentially about the retaining ring means, the casing means having an interior surface which defines the cavity, the lockwire engaging the interior surface of the casing means and the retaining ring means, whereby the rotation of said threaded member at a greater than design torque results in a rotation about the lockwire, preventing the application of excessive torquing forces to the threads of the insert means and said threaded member.

8. A fastening nut comprising:

a casing means for retaining a segmented threaded insert arrangement, the casing means having a forward portion for receiving a threaded member, a rearward portion remote from the forward portion, and an interior cavity for retaining said insert arrangement, the interior cavity defining a central axis and including an interior surface;

plural internally threaded insert segments for releasably engaging the thread of said threaded member, the insert segments having a forward portion having contiguous thread segments and a tail portion extending outwardly, the tail portion having an outer bevel surface matable with a circular inclined surface on the interior of the casing means facing the cavity, the insert segments being spreadable for allowing said threaded member to be inserted translationally through the insert segments, said insert segments being engagable in a fastening relationship with said threaded member when said threaded member is rotated relative to the insert segments;

cap means for retaining the insert segments within the cavity of the casing means, the cap means disposed adjacent the rearward portion of the casing means;

a circular spring means for engaging the insert segments and encircling a bevel surface of said cap means, said bevel surface facing the forward portion of the casing means for causing the circular spring means to urge the insert segments towards the forward portion of the casing means, the cap means and circular spring means having coaxial annular axes;

a retaining ring for preventing rotation of the insert means, the retaining ring having a circular band and spaced apart plural inwardly directed tangs, said tangs being positioned between said segments and engaging side surfaces of the insert segments remote from the forward portion of the cavity;

the insert segments having multiple spaced apart bevel surfaces disposed at substantially equal angles to the central axis of the casing means, and the casing means having multiple inclined surfaces mating with the bevel surfaces, whereby the bevel surfaces of the insert segments are movable radially along the inclined surfaces of the casing means;

whereby said threaded member pushed through the insert segments causes the insert segments to spread apart to allow translational movement of said threaded member through the insert segments, such that a fastening rotation of said threaded member causes the insert segments to grasp as the threads of said threaded member for tightening of the fastening nut to said threaded member.

9. The fastening nut as set forth in claim 8, further comprising a lockwire disposed circumferentially about the retaining ring, the casing means having an interior surface which defines the cavity, the lockwire engaging the interior surface of the casing means and the retaining ring, whereby the rotation of said threaded member at a greater than designed torque results in rotation of the retaining ring within the casing means, about the lockwire, preventing the application of excessive torquing forces to the threads of the insert means and said threaded member.

10. The fastening nut as set forth in claim 9 and comprising a wire locking groove in the casing coaxial with the central axis, and a circumferential dimple in the retaining ring, the lockwire disposed in engagement with both the wire locking groove and the circumferential dimple in the retaining ring.

11. The fastening nut as set forth in claim 8 wherein said threaded member disposed within the insert segment includes threads on a threaded portion and a head, the head having an abutment surface, whereby as the abutment surface engages the forward portion of the casing means, further rotation in a fastening relationship of said threaded member causes a tightening of the threads of the insert segments about the threads of said threaded member.

12. The fastening nut as set forth in claim 8 and in which the insert means comprising from 2 to 4 substantially contiguous segments, and having an internal thread diameter between about ¼ inch and ⅝ inch, and in which the angle of the bevel surface is between 31 degrees and 60 degrees.

* * * * *